United States Patent
Fukuda et al.

(10) Patent No.: US 11,741,355 B2
(45) Date of Patent: Aug. 29, 2023

(54) TRAINING OF STUDENT NEURAL NETWORK WITH TEACHER NEURAL NETWORKS

(71) Applicant: INTERNATIONAL BUSINESS MACHINES CORPORATION, Armonk, NY (US)

(72) Inventors: Takashi Fukuda, Yokohama (JP); Masayuki Suzuki, Tokyo (JP); Osamu Ichikawa, Yokohama (JP); Gakuto Kurata, Tokyo (JP); Samuel Thomas, Elmsford, NY (US); Bhuvana Ramabhadran, Mount Kisco, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1296 days.

(21) Appl. No.: 16/047,526

(22) Filed: Jul. 27, 2018

(65) Prior Publication Data
US 2020/0034703 A1    Jan. 30, 2020

(51) Int. Cl.
*G06N 3/08* (2023.01)
*G06N 3/045* (2023.01)
*G10L 25/51* (2013.01)
*G10L 15/02* (2006.01)

(52) U.S. Cl.
CPC ............... *G06N 3/08* (2013.01); *G06N 3/045* (2023.01); *G10L 15/02* (2013.01); *G10L 25/51* (2013.01); *G10L 2015/025* (2013.01)

(58) Field of Classification Search
CPC ........ G06N 3/08; G06N 3/0454; G06N 3/045; G10L 15/02; G10L 25/51; G10L 2015/025
See application file for complete search history.

(56) References Cited

U.S. PATENT DOCUMENTS

| | | | |
|---|---|---|---|
| 10,410,114 B2 * | 9/2019 | Kang | G06N 3/0454 |
| 2015/0340034 A1 | 11/2015 | Schalkwyk et al. | |
| 2016/0078339 A1 * | 3/2016 | Li | G06N 3/084 |
| | | | 706/20 |
| 2017/0083829 A1 | 3/2017 | Kang et al. | |
| 2017/0132528 A1 * | 5/2017 | Aslan | G06N 20/00 |
| 2018/0158552 A1 * | 6/2018 | Liu | G06N 3/0445 |
| 2018/0365564 A1 | 12/2018 | Huang et al. | |
| 2019/0034764 A1 * | 1/2019 | Oh | G06V 20/00 |

(Continued)

OTHER PUBLICATIONS

Shin et al., "Generative Knowledge Transfer for Neural Language Models," arXiv:1608.04077v3 [cs.LG], https://doi.org/10.48550/arXiv.1608.04077, Feb. 28, 2017 (Year: 2017).*

(Continued)

*Primary Examiner* — Michelle M Koeth
(74) *Attorney, Agent, or Firm* — Tutunjian & Bitetto, P.C.; Randy Emilio Tejeda (57) ABSTRACT

A student neural network may be trained by a computer-implemented method, including: inputting common input data to each teacher neural network among a plurality of teacher neural networks to obtain a soft label output among a plurality of soft label outputs from each teacher neural network among the plurality of teacher neural networks, and training a student neural network with the input data and the plurality of soft label outputs.

20 Claims, 5 Drawing Sheets

(56) References Cited

U.S. PATENT DOCUMENTS

2019/0304437 A1* 10/2019 Qian .................... G10L 15/063

OTHER PUBLICATIONS

U.S. Office Action issued in U.S. Appl. No. 16/047,287 dated Oct. 22, 2021, 26 pages.
Chebotar, Yevgen, et al. "Distilling Knowledge from Ensembles of Neural Networks for Speech Recognition." Interspeech, Sep. 2016, pp. 3439-3443.
Markov, Konstantin, et al. "Robust Speech Recognition Using Generalized Distillation Framework." Interspeech, Sep. 2016, pp. 2364-2368.
Grace Period Disclousre—Fukuda, Takashi, et al. "Efficient Knowledge Distillation from an Ensemble of Teachers." Proc. Interspeech 2017, Aug. 2017, pp. 3697-3701.
Yu, Dong, et al. "Recent progresses in deep learning based acoustic models." IEEE/CAA Journal of Automatica Sinica, Jul. 2017, pp. 396-409, 4(3).
Wong, Jeremy HM, et al. "Sequence student-teacher training of deep neural networks." Interspeech, Sep. 2016, pp. 2761-2765.
Grace Period Disclosure—Fukuda, Takashi, et al. "Knowledge Distillation from a Group of Broadband Neural Network Acoustic Models to a Narrowband Acoustic Model." 120th Audio Language Information Processing Conference and 118th Music Information Science Conference, Feb. 2018.
U.S. Office Action issued in U.S. Appl. No. 16/047,287 dated May 10, 2022, 27 pages.

\* cited by examiner

TRAINING OF STUDENT NEURAL NETWORK WITH TEACHER NEURAL NETWORKS

BACKGROUND

Technical Field

The present invention relates to training of student neural network with teacher neural networks.

Description of the Related Art

Knowledge distillation techniques (also known as "student-teacher training") have recently been investigated to make product level neural networks. In the knowledge distillation framework, a student neural network is trained with soft targets output from powerful teacher neural networks, rather than hard targets. However, conventional techniques require tuning of interpolation weights for combining the teacher neural networks, which may eventually consume enormous computational resources due to a large number of combinations.

SUMMARY

According to an aspect of the present invention, provided is a computer-implemented method including: inputting common input data to each teacher neural network among a plurality of teacher neural networks to obtain a soft label output among a plurality of soft label outputs output from each teacher neural network among the plurality of teacher neural networks, and training a student neural network with the input data and the plurality of soft label outputs.

The forgoing aspect may also include an apparatus configured to perform the computer-implemented method, and a computer program product storing instructions embodied on a computer-readable medium or programmable circuitry, that, when executed by a processor or the programmable circuitry, cause the processor or the programmable circuitry to perform the computer-implemented method. The summary clause does not necessarily describe all features of the embodiments of the present invention. Embodiments of the present invention may also include sub-combinations of the features described above.

DETAILED DESCRIPTION

Hereinafter, example embodiments of the present invention will be described. The example embodiments shall not limit the invention according to the claims, and the combinations of the features described in the embodiments are not necessarily essential to the invention.

Figure 1:
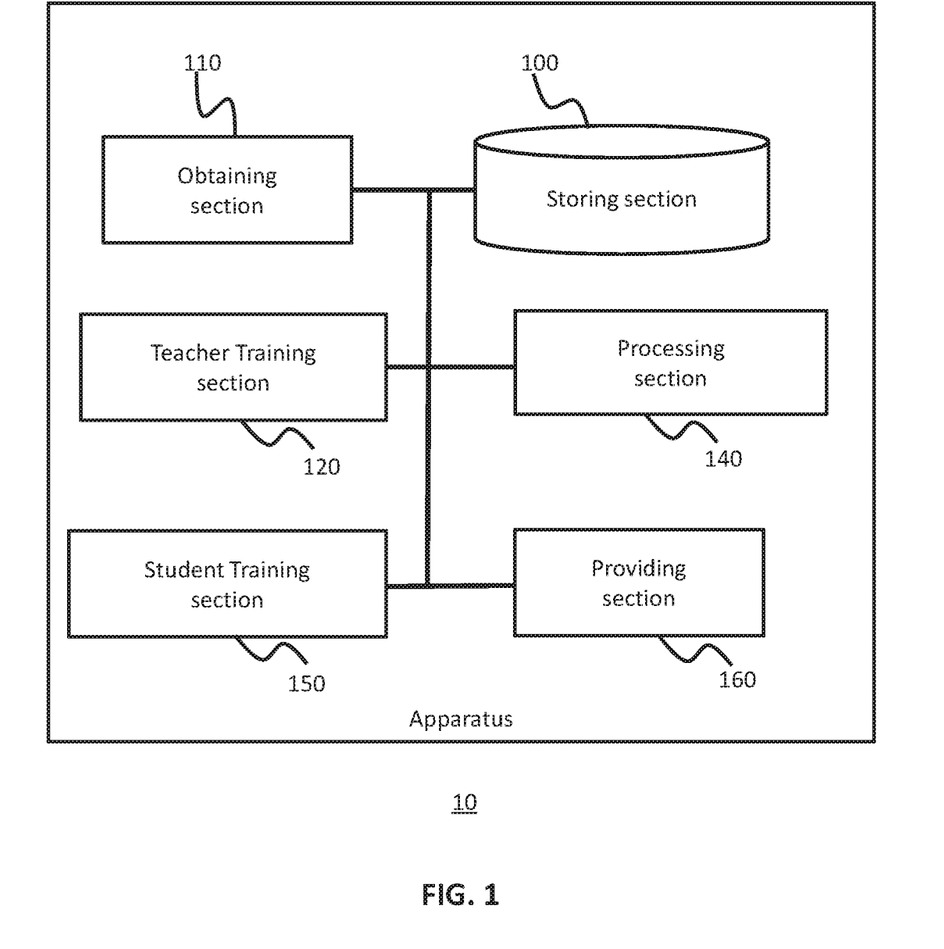
FIG. 1 shows an exemplary configuration of an apparatus 10 according to an embodiment of the present invention.

FIG. 1 shows an exemplary configuration of an apparatus 10, according to an embodiment of the present invention. The apparatus 10 may train a student neural network using soft label outputs that are output from teacher neural networks. In particular, the apparatus 10 may use the plurality of teacher neural networks for each input data for the training of the student neural network.

The apparatus 10 may include a processor and/or programmable circuitry. The apparatus 10 may further include one or more computer readable mediums collectively including instructions. The instructions may be embodied on the computer readable medium and/or the programmable circuitry. The instructions, when executed by the processor or the programmable circuitry, may cause the processor or the programmable circuitry to operate as a plurality of operating sections.

Thereby, the apparatus 10 may be regarded as including a storing section 100, an obtaining section 110, a teacher training section 120, a processing section 140, a student training section 150, and a providing section 160. In some embodiments, the apparatus 10 may be implemented by two or more computers as later explained in relation to FIG. 5.

The storing section 100 may store information used for the processing that the apparatus 10 performs. The storing section 100 may also store a variety of data/instructions used for operations of the apparatus 10. One or more other elements in the apparatus 10 (e.g., the obtaining section 110, the teacher training section 120, the processing section 140, the student training section 150, and the providing section 160) may communicate data directly or via the storing section 100, as necessary.

The storing section 100 may be implemented by a volatile or non-volatile memory of the apparatus 10. In some embodiments, the storing section 100 may store training data, test data, teacher input data, student and/or teacher neural networks, parameters and other data related thereto.

The obtaining section 110 may obtain at least one of training data, test data, a plurality of teacher input data, and parameters relating to teacher or student neural networks. The training data may be used for training of a plurality of teacher neural networks. The training data may include a plurality of pairs of a training input data and a correct training data corresponding to the training input data.

The test data may be used to evaluate the plurality of teacher neural networks. The test data may include a plurality of pairs of a test input data and a correct test data corresponding to the test input data. Each of the plurality of teacher input data may be input to a teacher neural network to obtain a soft label output. The obtaining section 110 may obtain other data necessary for operations of the apparatus 10.

The teacher training section 120 may train the plurality of teacher neural networks using the training data. In an embodiment, the teacher training section 120 may train two or more different types of teacher neural networks.

The processing section 140 may process calculation of the teacher neural networks. For example, the processing section 140 may input a training input data, a test input data, or a teacher input data (which may be hereinafter collectively referred to as "input data") into the teacher neural network and calculate a corresponding output from the neural network.

In an embodiment, the processing section 140 may input an input data to each teacher neural network among a plurality of teacher neural networks to obtain a soft label output among a plurality of soft label outputs from each teacher neural network among the plurality of teacher neural networks. The processing section 140 may also evaluate the plurality of teacher neural networks.

The student training section 150 may train a student neural network. The student training section 150 may train the student neural network with at least the teacher input data and the plurality of soft label outputs output from the plurality of teacher neural networks. In an embodiment, the student training section 150 may repeat trainings of the student neural network by using the teacher input data and each of the plurality of soft label outputs. In the embodiment, the student training section 150 may use common teacher input data and each soft label output from the plurality teacher neural networks for each training.

The providing section 160 may provide the student neural network trained by the student training section 150 to an external device. In an embodiment, the external device has less computational resources than the apparatus 10. For example, the apparatus 10 may be a server computer having plentiful computational power, while the external device may be a small portable device such as a mobile phone, a mobile computer, a smart phone, a smart watch, a smart speaker, and/or other smart devices.

Figure 2:
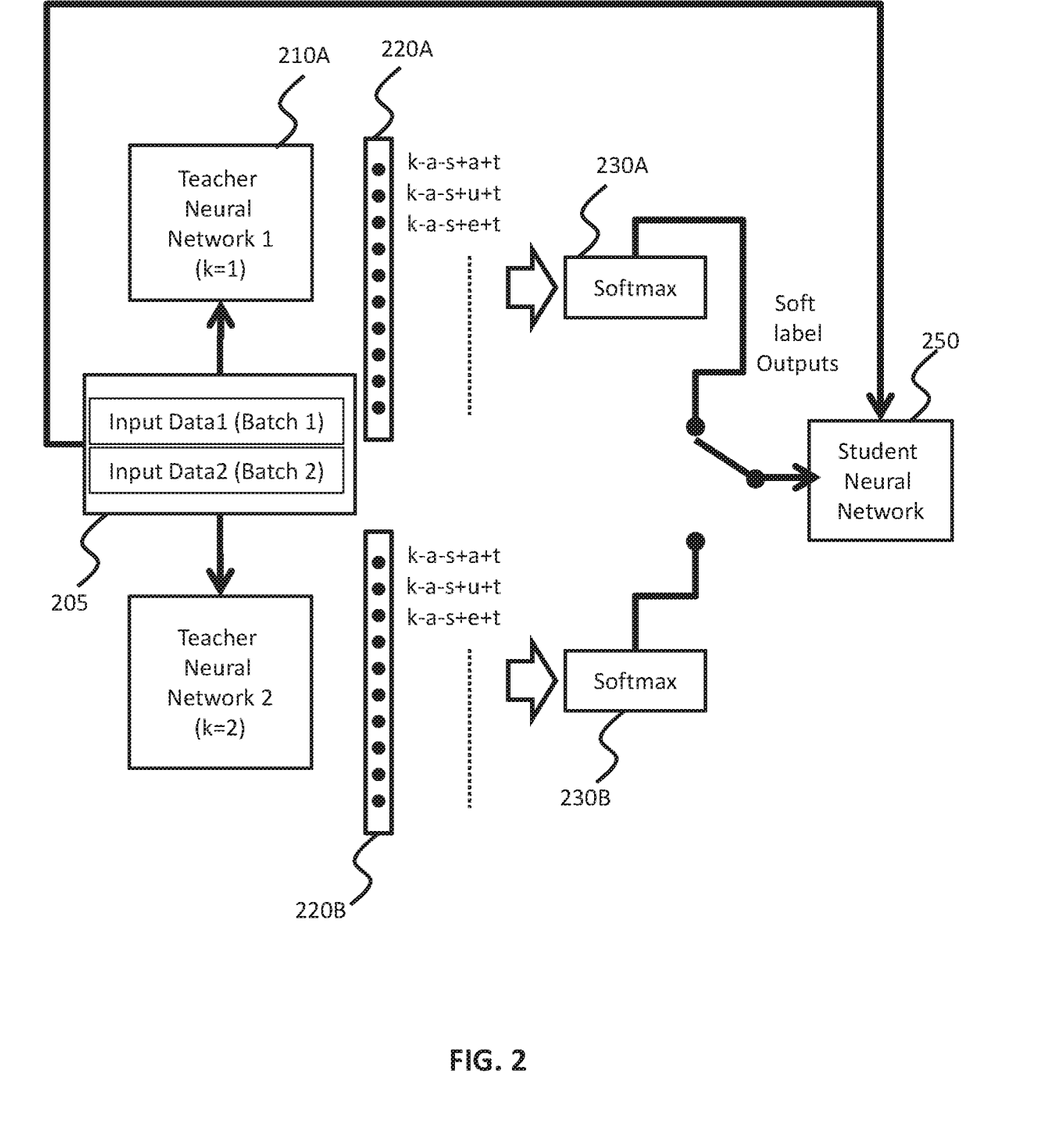
FIG. 2 shows an exemplary framework according to an embodiment of the present invention.

FIG. 2 shows an exemplary framework, according to an embodiment of the present invention. In a specific embodiment, the teacher neural networks and the student neural networks may receive audio data as the input data and output a classification of the audio data as the soft label output.

In the embodiment of FIG. 2, one teacher neural network 1 (shown as 210A) receives input data 205, such as "input data 1", and another teacher neural network 2 (shown as 210B) receives the same or substantially the same input data for each training. For example, Teacher neural networks 210A and 210B both receive "input data 1." in a training, and then both receive "input data 2" in another training. Input data 1 and input data 2 may be audio data of human speech sampled at a particular sampling frequency. The audio data may be raw audio data that is not processed, or a feature vector derived from the raw audio data (such as logMel feature vector, mel-frequency cepstrum coefficient (MFCC) feature vector, etc.). Input data 1 and input data 2 may be different audio data, for example, derived from different portions of the same speech.

In other words, input data 1 and input data 2 may be different batches. For example, input data 1 may be the first, third, or fifth instance of 256 frames of the audio data of a speech of a person, and input data 2 may be second, fourth, or sixth instance of 256 frames of the audio data of the speech.

The teacher neural network 1 (210A) may receive "input data 1" as a teacher input data, and output a soft label output corresponding to the input data 1 from its output layer (shown as 220A). The soft label output may be a classification of the audio data identifying phonemes.

In the embodiment, the soft label output includes possibilities of phonemes such as "k–a–s+a+t", "k–a–s+u+t", "k–a–s+e+t", etc. For example, if a soft label output from the teacher neural network 1 is a vector including 0.1, 5.1, 2.4, . . . , the soft label output may indicate that a possibility that the sound of the input data 1 represents "k–a–s+a+t" is proportional to 0.1, a possibility that the sound of the input data 1 represents "k–a–s+u+t" is proportional to 5.1, a possibility that the sound of the input data 1 represents "k–a–s+e+t" is proportional to 2.4 . . .

The soft label output generated by the output layer 220A may be normalized by a softmax layer (shown as 230A) to output the normalized soft label output. The normalized soft label output may be a vector having values in which the sum is 1.

Similarly, the teacher neural network 2 may also receive "input data 1" as a teacher input data, and output a soft label output corresponding to the input data 1 from its output layer (shown as 220B). The soft label output output from the output layer 220B may be normalized by a softmax layer (shown as 230B) to output the normalized soft label output.

A student training section, such as the student training section 150, may train a student neural network (shown as 250) with a pair of input data 1 and the normalized soft label output generated by the softmax layer 230A. Then the student training section 150 may train the student neural network 250 with a pair of input data 1 and the normalized soft label output generated by from the softmax layer 230B. Thereby, the student training section 150 may augment the training of the student neural network by using a plurality of teacher neural networks for each teacher input data. Hereinafter the term "soft label output" may include both normalized and not normalized soft label output.

Figure 3:
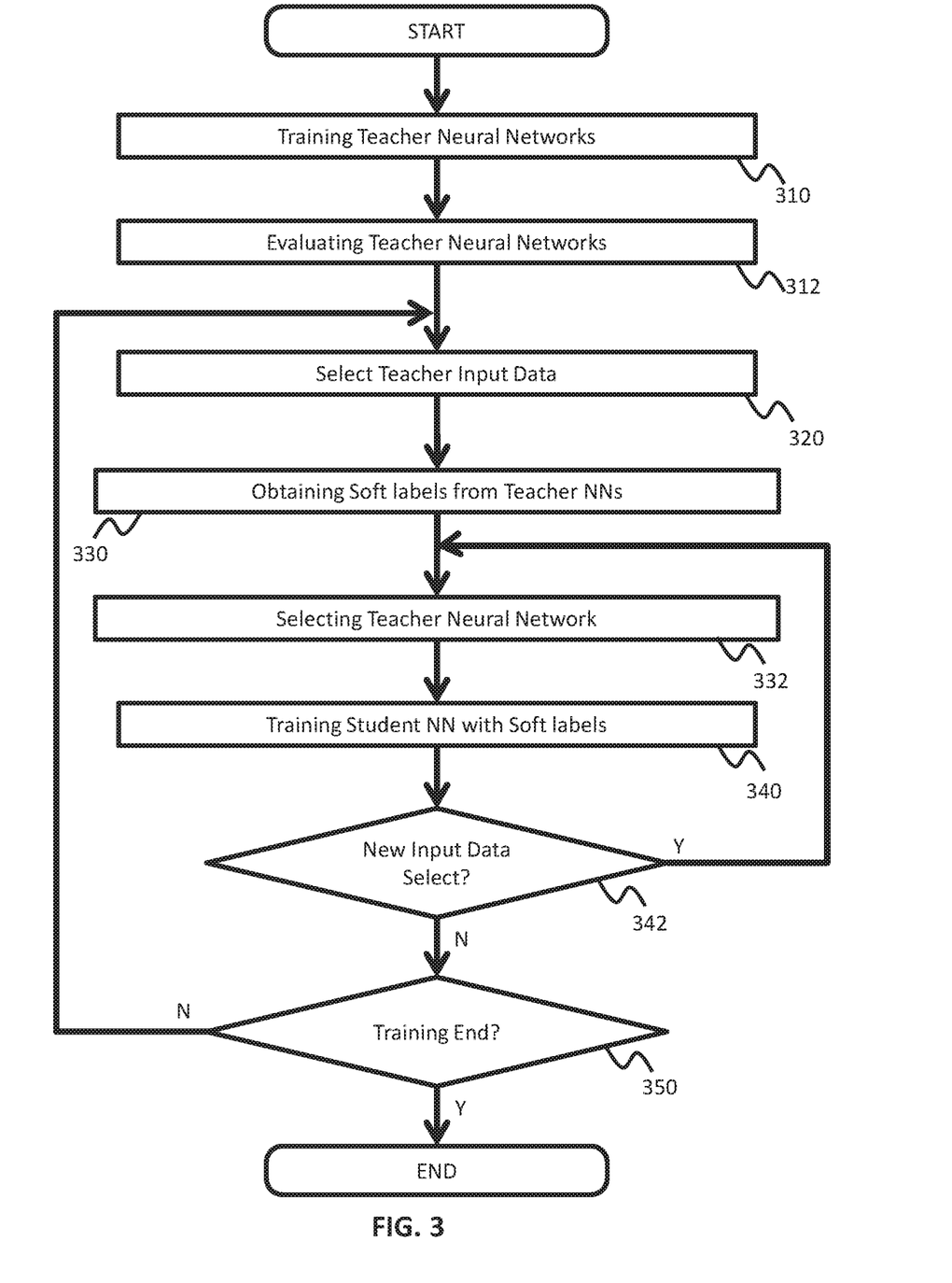
FIG. 3 shows an operational flow according to an embodiment of the present invention.

FIG. 3 shows an operational flow according to an embodiment of the present invention. The present embodiment describes an example in which an apparatus, such as the apparatus 10, performs operations represented by block 310 to block 350, as shown in FIG. 3 to train a student neural network.

At block 310, a teacher training section, such as the teacher training section 120, may train a plurality of teacher neural networks. The teacher training section 120 may train a plurality of types of teacher neural networks. For example, the teacher training section 120 may train teacher neural networks that have different structure, different layers, different nodes, etc. In an embodiment, the plurality of teacher neural networks may include two or more of: Convolutional Neural Networks (CNN), Visual Geometry Group (VGG) networks, and Long short-term memory (LSTM) networks.

The teacher training section 120 may train the teacher neural networks, at block 310, using the training data. In an embodiment, the teacher training section 120 may train each teacher neural network in an effort to minimize errors between correct training data and soft label outputs generated by the teacher neural network that receives the training input data corresponding to the correct training data.

In a specific embodiment, during the training of a teacher neural network at block 310, the teacher training section 120 may repeat iterations, wherein each iteration includes: inputting the input data into the teacher neural network, comparing an output data (e.g., a soft label output) of the teacher neural network with the corresponding correct training data, and adjusting a plurality of weights between nodes in the teacher neural network based on the comparison. At block 310, the teacher training section 120 may perform the adjusting by known computer-implemented methods such as back propagation.

At block 312, a processing section, such as the processing section 140, may evaluate the plurality of teacher neural networks. The processing section 140 may evaluate an accuracy of each of the plurality of teacher neural networks using test data.

At block 312, the processing section 140 may input each of a plurality of test input data of the test data into each teacher neural network, perform calculation of the each neural network, and calculate each of a plurality of outputs of the each teacher neural network, such as soft label outputs. The processing section 140 may evaluate, at block 312, an accuracy of a soft label output in comparison with a correct test data corresponding to the test input data of the test data.

In another embodiment, the processing section 140, block 312, may evaluate average word error rate (or WER) of each teacher neural network by referring to a plurality of correct test data of the test data.

In another embodiment, the processing section 140, block 312, may evaluate the proximity of soft label outputs generated by each teacher neural network to corresponding correct test data of the test data, to determine the accuracy of the each teacher neural network. For example, the processing section 140 may calculate an average distance between vectors representing the soft label outputs and vectors representing the plurality of correct test data as representative of the accuracy, at block 312.

After the operation at block 312, the apparatus 10 may repeat iterations, each of which includes operations represented by block 320 to block 350. Thereby, the apparatus 10 may repeat operations represented by block 320, block 330, block 332, block 340, block 342 and block 350.

At block 320, a processing section, such as the processing section 140, may select a teacher input data among a plurality of teacher input data. In an embodiment, the processing section 140 may select the teacher input data among the plurality of teacher input data. In an embodiment, the plurality of teacher input data, at block 320, may be the first, third, or fifth instance of 256 frames of the audio data of a speech of a person. In the embodiment, the processing section 140 may select the first instance of 256 frames of the audio data at the first iteration of block 320 to block 350, select the second instance of 256 frames at the second iteration, select the third instance of 256 frames at the third iteration, and so on.

At block 330, the processing section 140 may obtain a plurality of soft label outputs output from the plurality of teacher neural networks. In an embodiment, the processing section 140, at block 330, may input the teacher input data, selected at the most recent iteration of block 320, to the plurality of teacher neural networks, and calculate soft label outputs generated by the plurality of teacher neural networks.

After the operation of 330, the apparatus 10 may repeat loops, each of which includes operations represented by block 332 to block 342 and is performed for the teacher input data selected at 320. Thereby, the apparatus 10 may repeat operations represented by block 332, block 340 and block 342.

At block 332, the student training section 150 may select a teacher neural network among a plurality of teacher neural networks. In an embodiment, the student training section 150 may, at block 332, select a teacher neural network in a predetermined order in each iteration of block 320 to block 350. For example, the student training section 150, at block 332, may select a teacher neural network in an ascending order (such as Teacher Neural Network (or TNN) 1 at a first loop of block 332 to block 342, TNN2 at a second loop, TNN3 at a third loop for each iteration of block 320 to block 350).

In an embodiment, the student training section 150, at block 332, may select a teacher neural network based on the accuracy evaluated at block 312. In the embodiment, the student training section 150 may select, at block 332, a less accurate teacher neural network earlier than other teacher neural networks among the plurality of teacher neural networks in terms of iterations of block 320 to block 350. In a specific embodiment, the student training section 150 may select, at block 332, the most accurate teacher neural network among the plurality of teacher neural networks last (e.g., the last loop of block 332 to block 342) in terms of iterations.

At block 340, a student training section 150 may train a student neural network with a teacher input data selected at the most recent iteration of block 320 and the corresponding soft label output of the teacher neural network selected at the most recent iteration of block 332. Thereby, the student training section 150 may train the student neural network, at block 340, with the teacher input data and each soft label output of the soft label outputs of the plurality of teacher neural networks during the iteration of block 320 to block 350.

In an embodiment, the student training section 150 may train the student neural network, at block 340, such that soft label errors between (1) a soft label output generated by the student neural network in response to receiving the teacher input data (e.g., Input Data 1) and (2) the soft label output generated by the selected teacher neural network (e.g., Teacher NN1) in response to receiving the same teacher input data, is minimized.

In a specific embodiment, the student training section 150 may repeat iterations of block 340, wherein each iteration includes: inputting the teacher input data into the student neural network, comparing an output data (e.g., soft label output) of the student neural network with the soft label output from a teacher neural network, and adjusting a plurality of weights between nodes in the student neural network based on the comparison. The student training section 150 may perform the adjusting, at block 340, by known computer-implemented methods such as back propagation.

For example, the student training section 150 may determine θ such that L(θ) is minimized. L(θ) is defined as follows:

$$L(\theta) = -\Sigma_i q_i \log p_i,$$

where θ represents the student neural network including weights between nodes and trainable parameters of the student neural network, i represents an index of nodes in the output layer of the student neural network and the teacher neural networks, $q_i$ represents a value of i-th index in the soft label output from the selected teacher neural network, and $p_i$ represents an output probability of i-th class (e.g., i-th index in a soft label output) output from the student neural network.

The student training section 150 may train the student neural network, at block 340, with both soft label outputs and hard labels. In an embodiment, the student training section 150 may train the student neural network, at block 340, with at least a correct test data corresponding to the input data in addition to the teacher input data and the soft label output from the selected teacher neural network. In the embodiment, the student training section 150 may train the student neural network, at block 340, such that a sum of (A) the foregoing soft label errors and (B) hard label errors between (1) a soft label output from the student neural network in response to receiving the teacher input data (e.g., Input Data 1) and (2) the teacher correct data, is minimized.

In an embodiment, the student neural network may be smaller than the plurality of neural networks such as having a small number of nodes and/or layers than the plurality of teacher neural networks. For example, the student neural network may be a compact CNN that has 2 convolutional layers with 64 and 128 hidden nodes each, 2 fully connected layers with 768 hidden units per layer, and 256 hidden-unit bottleneck layer.

At block 342, the student training section 150 may determine whether to select a new teacher neural network. The student training section 150 may go back to block 332 when there is at least one teacher neural network that has not been selected in a pending iteration of block 320 to block 350. Otherwise, the student training section 150 may proceed to block 350.

At block 350, the student training section 150 may determine whether to continue the training of the student neural network. The student training section 150, at block 350, may go back to block 320 to begin a new iteration starting at block 320 with selecting new teacher input data, unless the student training section 150 determines, at block 350, to end the training, in which point the student training section150 may end the training of the student neural network.

In an embodiment, the student training section 150 may determine to end the training, at block 350, when all or a predetermined amount of teacher input data is used for the training of the student neural network.

Figure 4:
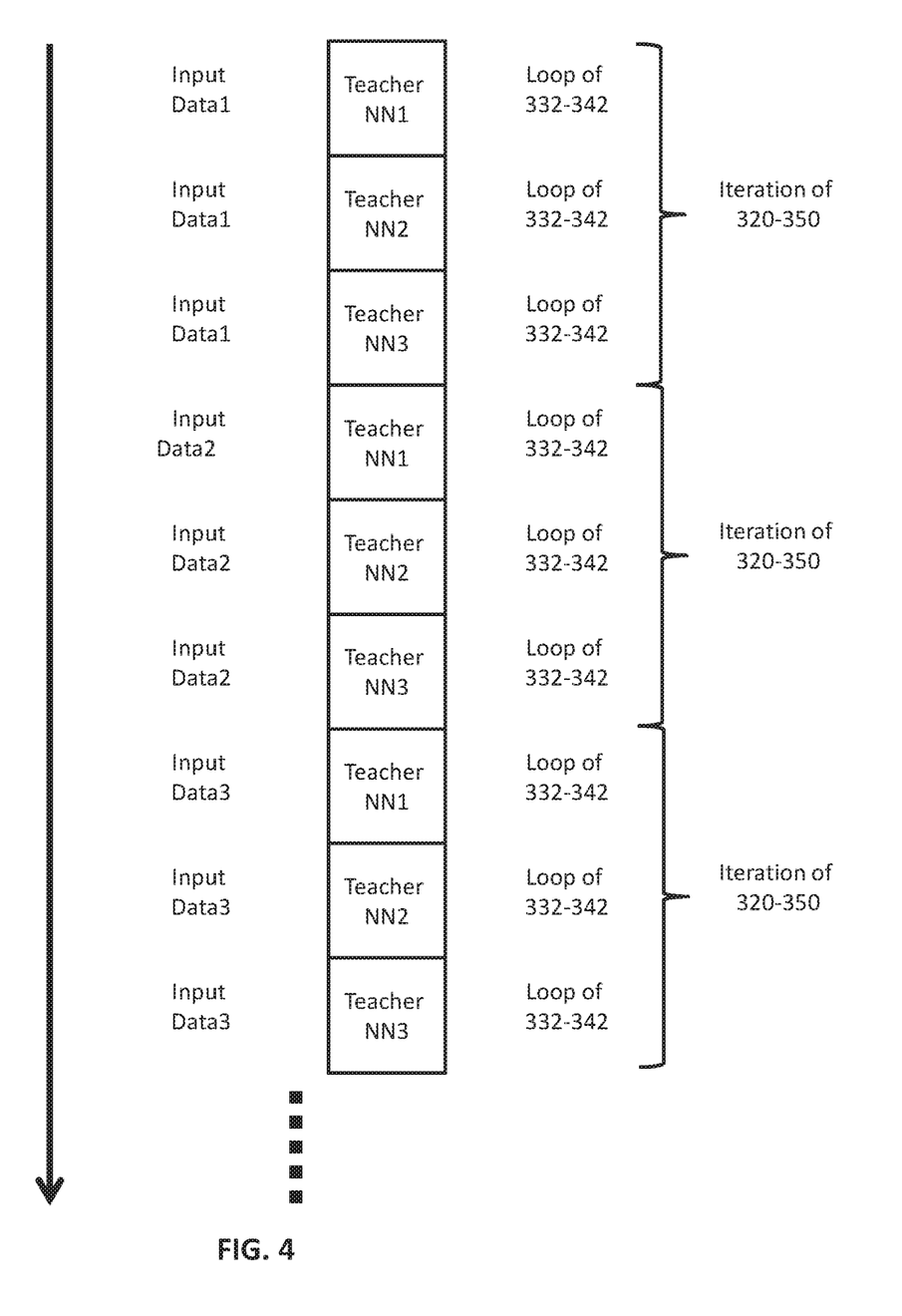
FIG. 4 shows input data and teachers during iterations according to an embodiment of the present invention.

FIG. 4 shows a plurality of input data and a plurality of teacher neural networks during iterations of block 320 to block 350 according to an embodiment of the present invention. In an embodiment of FIG. 4, three teacher neural networks: Teacher NN1, Teacher NN2 and Teacher NN3 (which may include the teacher neural networks 210A and 210B in FIG. 2) are trained at block 310. In the embodiment, Teacher NN3 is evaluated as the most accurate neural network and Teacher NN2 is evaluated as the second most accurate neural network at block 312. In an embodiment, at least one of Teacher NN1 to Teacher NN3 may be LSTM that has 4 bidirectional LSTM layers with 512 units per direction and linear bottleneck layer with 256 units. At least another one of Teacher NN1 to Teacher NN3 may be VGG that has 10 convolutional layers, a max pooling layer inserted after every 3 convolutional layers, and followed by 4 fully connected layers.

In the embodiment, the student training section 150 first selects Teacher NN1, and the processing section 140 inputs the first teacher input data (shown as Input Data 1) into Teacher NN1 at the first loop of block 332 to block 342 of the first iteration of block 320 to block 350. The student training section 150 selects Teacher NN2, and the processing section 140 inputs the first teacher input data (shown as Input Data 1) into Teacher NN2 at the second loop of block 332 to block 342 of the first iteration. The student training section 150 selects Teacher NN3, and the processing section 140 inputs the first teacher input data (shown as Input Data 1) into Teacher NN3 at the third loop of block 332 to block 342 of the first iteration.

Then the student training section 150 selects Teacher NN1, NN2, NN3 for Input Data 2 at the $1^{st}$ through $3^{rd}$ loops of the second iteration and Input Data 3 at the $1^{st}$ through $3^{rd}$ loops of the third iteration, and the processing section 140 inputs the second and third teacher input data (Input Data 2 and Input Data 3) into each selected teacher neural network at the second through third iterations.

As shown in the embodiment of FIG. 4, the student training section 150 may select all teacher neural networks for each teacher input data, and use a soft label output of a less accurate teacher neural network (e.g., Teacher NN1) among the plurality of teacher neural networks earlier than a soft label output of an accurate teacher neural network (e.g., Teacher NN2 or Teacher NN3) among the plurality of teacher neural networks. In particular, the student training section 150 may use a soft label output of the most accurate teacher neural network (e.g., Teacher NN3) among the plurality of teacher neural networks at the last iteration of block 320 to block 350 for each input data. During the iterations of block 320 to block 350, the processing section 140 inputs different input data (e.g., Input Data 1 to Input Date 3) into the teacher neural networks.

As explained above, the apparatus 10 trains a plurality of teacher neural networks, and then trains a student neural network with each soft label output from the plurality of teacher neural networks. In general, significant computational resources (such as calculation power, memory, etc.) are needed for implementing accurate neural networks such as the teacher neural networks. On the other hand, according to the foregoing embodiments, the apparatus 10 may train a student neural network to have similar characteristics and accuracy with teacher neural networks without requiring the same amount of computational resources than the teacher neural networks.

In addition, a large number of soft label outputs may be necessary to train an accurate student neural network, and thus a large number of teacher input data may be required. However, it may be difficult to prepare the large number of teacher input data. However, according to the foregoing embodiments, the apparatus 10 multiplies soft label outputs from one teacher input data by using the plurality of teacher neural networks. Thereby, the apparatus 10 can obtain the accurate student neural network with less teacher input data.

In addition, the apparatus 10 may use each of plurality of teacher neural networks rather than combine them. Thereby, the apparatus 10 may not need to tune interpolation weights between the teacher neural networks.

In some embodiments, the teacher neural networks may input privileged data in addition to the input data for outputting the soft label output. For example, the teacher training section 120 may train the teacher neural networks with the privileged data in addition to the training input data at block 310, and the processing section 140 may input the privileged data in addition to the teacher input data at block 330. The privileged data may include at least one of information (such as gender, age, body information, a native language, etc.) regarding the speaker associated with an audio sample.

In some embodiments, the student training section 150 may additionally train a student neural network by a hard label at block 340. In the embodiments, the student training section 150 may train the student neural network with the training data, including one or more of pairs of a training input data and a correct training data, after the iterations of block 320 to block 350.

Figure 5:
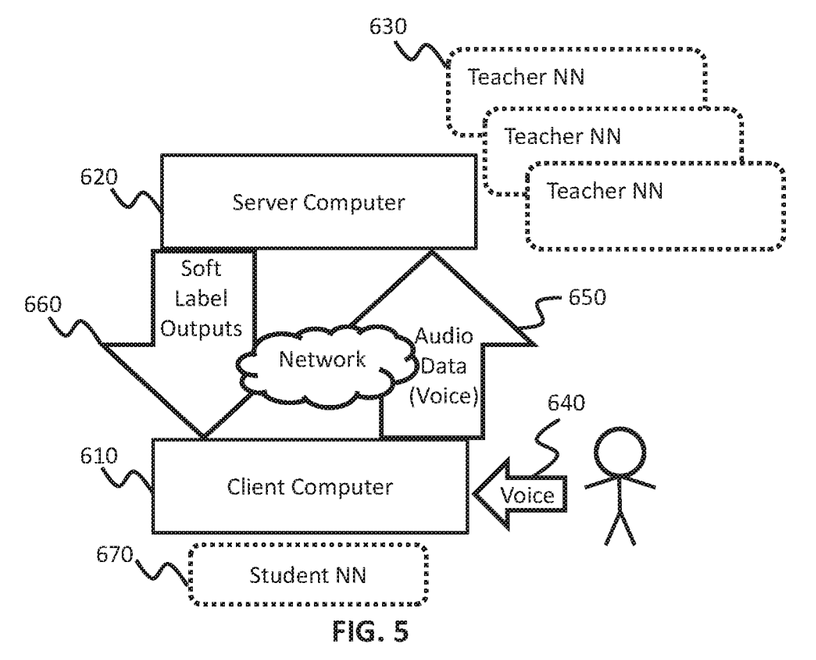
FIG. 5 shows a client-server environment according to an embodiment of the present invention.

FIG. 5 shows a client-server environment according to an embodiment of the present invention. In an embodiment of FIG. 5, an apparatus, such as the apparatus 10, may be implemented by at least computers such as a client computer 610 and a server computer 620.

The client computer 610 may be a smart device such as a smart speaker. In an embodiment, the server computer 620 may include at least the teacher training section 120, and the processing section 140. The client computer 610 may include at least the student training section 150.

The server computer 620 may train a plurality of teacher neural networks 630 (shown as the multiple instances of Teacher NN), at block 310 (FIG. 3), before selecting a teacher neural network 630, at block 332 (FIG. 3). The client computer 610 may obtain audio data 640 of a speech from a person (e.g., a user of the client computer 610) as teacher input data. The client computer 610 may transmit the teacher input data 650 to the server computer 620.

The server computer 620 may receive the teacher input data 650 from the client computer 610. The server computer 620 may input the teacher input data 650, at block 320 (FIG. 3), to the plurality of teacher neural networks 630 to obtain the soft label outputs 660, at block 330 (FIG. 3), from the plurality of teacher neural networks 630.

The server computer 620 may transmit the soft label outputs 660 to the client computer 610. The client computer 610 may train the student neural network 670, at block 340 (FIG. 3), with at least the teacher input data 650 and the soft label outputs 660 from the plurality of teacher neural networks 630.

According to the embodiment of FIG. 5, the training of the teacher neural networks 630, which may need significant computational resources, is performed by the server computer 620, while the training of the student neural network 670, which may need significantly less computational resources, is performed at the client computer 610 in real time. In the embodiment, the server computer 620 may preliminarily train the student neural network 670 and provide the client computer 610 with the trained student neural network 670. The client computer 610 may update the preliminarily trained student neural network 670 in real time.

The embodiments where the neural networks represent acoustic models and classify the audio data are mainly explained above. However, the teacher and student neural networks may have other types of functions. For example, the teacher and student neural networks may represent other types of models such as language model, image recognition models, meteorological model, economical model, etc.

Figure 6:
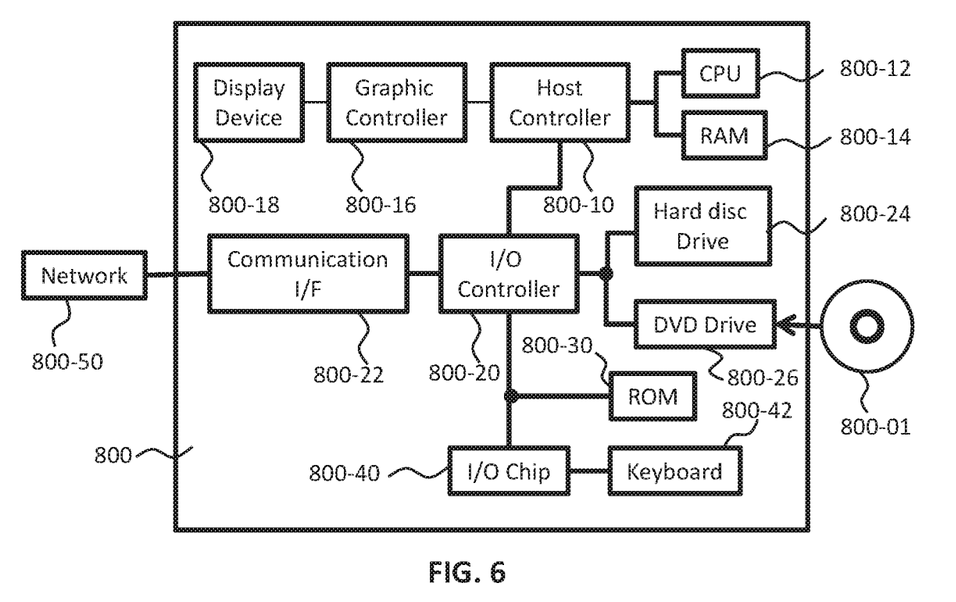
FIG. 6 shows an exemplary hardware configuration of a computer that functions as a system, according to an embodiment of the present invention.

FIG. 6 shows an exemplary hardware configuration of a computer configured for the training of the student neural network with the plurality of teacher neural networks, according to an embodiment of the present invention. A program that is installed in the computer 800 can cause the computer 800 to function as, or perform operations associated with apparatuses of the embodiments of the present invention or one or more sections (including modules, components, elements, etc.) thereof, and/or cause the computer 800 to perform processes of the embodiments of the present invention or steps thereof. Such a program may be executed by the CPU 800-12 to cause the computer 800 to perform certain operations associated with some or all of the blocks of flowcharts and block diagrams described herein.

The computer 800 according to the present embodiment includes a CPU 800-12, a RAM 800-14, a graphics controller 800-16, and a display device 800-18, which are mutually connected by a host controller 800-10. The computer 800 also includes input/output units such as a communication interface 800-22, a hard disk drive 800-24, a DVD-ROM drive 800-26 and an IC card drive, which are connected to the host controller 800-10 via an input/output controller 800-20. The computer also includes legacy input/output units such as a ROM 800-30 and a keyboard 800-42, which are connected to the input/output controller 800-20 through an input/output chip 800-40.

The CPU 800-12 operates according to programs stored in the ROM 800-30 and the RAM 800-14, thereby controlling each unit. The graphics controller 800-16 obtains image data generated by the CPU 800-12 on a frame buffer or the like provided in the RAM 800-14 or in itself, and causes the image data to be displayed on the display device 800-18.

The communication interface 800-22 communicates with other electronic devices via a network 800-50. The hard disk drive 800-24 stores programs and data used by the CPU 800-12 within the computer 800. The DVD-ROM drive 800-26 reads the programs or the data from the DVD-ROM 800-01, and provides the hard disk drive 800-24 with the programs or the data via the RAM 800-14. The IC card drive reads programs and data from an IC card, and/or writes programs and data into the IC card.

The ROM 800-30 stores therein a boot program or the like executed by the computer 800 at the time of activation, and/or a program depending on the hardware of the computer 800. The input/output chip 800-40 may also connect various input/output units via a parallel port, a serial port, a keyboard port, a mouse port, and the like to the input/output controller 800-20.

A program is provided by computer readable media such as the DVD-ROM 800-01 or the IC card. The program is read from the computer readable media, installed into the hard disk drive 800-24, RAM 800-14, or ROM 800-30, which are also examples of computer readable media, and executed by the CPU 800-12. The information processing described in these programs is read into the computer 800, resulting in cooperation between a program and the above-mentioned various types of hardware resources. An apparatus or method may be constituted by realizing the operation, or processing of information in accordance with the usage of the computer 800.

For example, when communication is performed between the computer 800 and an external device, the CPU 800-12 may execute a communication program loaded onto the RAM 800-14 to instruct communication processing to the communication interface 800-22, based on the processing described in the communication program. The communication interface 800-22, under control of the CPU 800-12, reads transmission data stored on a transmission buffering region provided in a recording medium such as the RAM 800-14, the hard disk drive 800-24, the DVD-ROM 800-01, or the IC card, and transmits the read transmission data to network 800-50 or writes reception data received from network 800-50 to a reception buffering region or the like provided on the recording medium.

In addition, the CPU 800-12 may cause all or a necessary portion of a file or a database to be read into the RAM 800-14, the file or the database having been stored in an external recording medium such as the hard disk drive 800-24, the DVD-ROM drive 800-26 (DVD-ROM 800-01), the IC card, etc., and perform various types of processing on the data on the RAM 800-14. The CPU 800-12 may then write back the processed data to the external recording medium.

Various types of information, such as various types of programs, data, tables, and databases, may be stored in the recording medium to undergo information processing. The CPU 800-12 may perform various types of processing on the data read from the RAM 800-14, which includes various types of operations, processing of information, condition judging, conditional branch, unconditional branch, search/replace of information, etc., as described throughout this disclosure and designated by an instruction sequence of programs, and writes the result back to the RAM 800-14.

In addition, the CPU 800-12 may search for information in a file, a database, etc., in the recording medium. For example, when a plurality of entries, each having an attribute value of a first attribute is associated with an attribute value of a second attribute, are stored in the recording medium, the CPU 800-12 may search for an entry matching the condition whose attribute value of the first attribute is designated, from among the plurality of entries, and reads the attribute value of the second attribute stored in the entry, thereby obtaining the attribute value of the second attribute associated with the first attribute satisfying the predetermined condition.

The above-explained program or software modules may be stored in the computer readable media on or near the computer 800. In addition, a recording medium such as a hard disk or a RAM provided in a server system connected to a dedicated communication network or the Internet can be used as the computer readable media, thereby providing the program to the computer 800 via the network.

The present invention may be a system, a method, and/or a computer program product. The computer program product may include a computer readable storage medium (or media) having computer readable program instructions thereon for causing a processor to carry out aspects of the present invention. The apparatus of the embodiments of the present invention may include the computer readable medium and the processor or programmable circuitry operable to execute the instructions.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to individualize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

As made clear from the above, the embodiments of the present invention enable to train the student neural network by the plurality of teacher neural networks.

What is claimed is:

1. A computer-implemented method, comprising:
   inputting input data to each teacher neural network among a plurality of teacher neural networks to obtain a soft label output among a plurality of soft label outputs from each teacher neural network among the plurality of teacher neural networks, wherein the plurality of teacher neural networks includes two or more different types of teacher neural networks;
   evaluating an accuracy of each of the plurality of teacher neural networks using test data;
   iteratively training a student neural network with the input data and the plurality of soft label outputs by selecting two or more of the plurality of teacher neural networks in a predetermined order for each of two or more training iterations;
   iteratively increasing a frequency of selecting a particular teacher neural network among the plurality of teacher neural networks based on a comparison of an accuracy of the soft label output from the particular teacher neural network with corresponding correct training data; and
   adjusting one or more of a plurality of weights between nodes in the selected teacher neural network based on the comparison as a number of iterations increases.

2. The method of claim 1, wherein training the student neural network includes
   repeating the iterations, each iteration including:
   inputting the input data into the student neural network,
   comparing an output data of the student neural network with the soft label output among the plurality of soft label outputs,
   adjusting a plurality of weights in the student neural network based on the comparison, and
   using the plurality of soft label outputs for the each iteration of the training the student neural network.

3. The method of claim 2, wherein using the plurality of soft label outputs includes:
   using the soft label output of a less accurate teacher neural network among the plurality of teacher neural networks earlier than the soft label output of an accurate teacher neural network among the plurality of teacher neural networks.

4. The method of claim 1, wherein training the student neural network includes,
   using the soft label output of the most accurate teacher neural network among the plurality of teacher neural networks for the input data.

5. The method of claim 1, wherein the input data is audio data and each soil label output is a classification of the audio data.

6. The method of claim 5, wherein the classification of the audio data identifies phonemes.

7. The method of claim 1, wherein training the student neural network includes;
   training the student neural network with at least the input data, the plurality of soft label outputs, and a correct data corresponding to the input data.

8. The method of claim 1, further comprising:
   training the plurality of teacher neural networks by a server computer, and
   receiving, by the server computer, the input data from a client computer,
   wherein inputting an input data to each teacher neural network among a plurality of teacher neural networks includes:
   inputting, by the server computer, the input data to each teacher neural network to obtain the soft label output from each teacher neural network, and
   transmitting, by the server computer, the plurality of soft label outputs to the client computer,
   wherein training the student neural network includes:
   training, by the client computer, the student neural network with at least the input data and the plurality of soft label outputs.

9. A neural network training apparatus comprising:
   a processor or a programmable circuitry; and
   one or more computer readable mediums collectively including instructions that, when executed by the processor or the programmable circuitry, cause the processor or the programmable circuitry to perform operations including:
   inputting an input data to each teacher neural network among a plurality of teacher neural networks to obtain a soft label output among a plurality of soft label outputs from each teacher neural network among the plurality of teacher neural networks, wherein the plurality of teacher neural networks includes two or more different types of teacher neural networks;
   evaluating an accuracy of each of the plurality of teacher neural networks using test data;
   iteratively training a student neural network with the input data and the plurality of soft label outputs by selecting two or more of the plurality of teacher neural networks in a predetermined order for each of two or more training iterations;
   iteratively increasing a frequency of selecting a particular teacher neural network among the plurality of teacher neural networks based on a comparison of an accuracy of the soft label output from the particular teacher neural network with corresponding correct training data; and adjusting one or more of a plurality of weights between nodes in the selected teacher neural network based on the comparison as a number of iterations increases.

10. The apparatus of claim 9, wherein training the student neural network includes:
repeating the iterations, each iteration including:
inputting the input data into the student neural network,
comparing an output data of the student neural network with the soft label output among the plurality of soft label outputs,
adjusting a plurality of weights in the student neural network based on the comparison, and
using the plurality of soft label outputs for the each iteration of the training the student neural network.

11. The apparatus of claim 10, wherein using the soft label outputs includes:
using the soft label output of a less accurate teacher neural network among the plurality of teacher neural networks in an earlier iteration than the soft label output of an accurate teacher neural network among the plurality of teacher neral networks.

12. The apparatus of claim 9, wherein training the student neural network includes:
using the soft label output of the most accurate teacher neural network among the plurality of teacher neural networks in a last iteration.

13. The apparatus of claim 9, wherein the input data is audio data and each soft label output is a classification of the audio data.

14. The apparatus of claim 13, wherein the classification of the audio data identifies phonemes.

15. A computer program product including one or more computer readable storage mediums collectively storing program instructions for improving neural network training that are executable by a processor or programmable circuitry to cause the processor or programmable circuitry to perform operations comprising:
inputting an input data to each teacher neural network among a plurality of teacher neural networks to obtain a soft label output among a plurality of soft label outputs from each teacher neural network among the plurality of teacher neural networks, wherein the plurality of teacher neural networks includes two or more different types of teacher neural networks;
evaluating an accuracy of each of the plurality of teacher neural networks using test data;
iteratively training a student neural network with the input data and the plurality of soft label outputs by selecting two or more of the plurality of teacher neural networks in a predetermined order for each of two or more training iterations;
iteratively increasing a frequency of selecting a particular teacher neural network among the plurality of teacher neural networks based on a comparison of an accuracy of the soft label output from the particular teacher neural network with corresponding correct training data; and
adjusting one or more of a plurality of weights between nodes in the selected teacher neural network based on the comparison as a number of iterations increases.

16. The computer program product of claim 15, wherein training the student neural network includes:
repeating the iterations, each iteration including:
inputting the input data into the student neural network,
comparing an output data of the student neural network with the soft label output among the plurality of soft label outputs,
adjusting a plurality of weights in the student neural network based on the comparison, and
using the soft label outputs for the each iteration of the training the student neural network.

17. The computer program product of claim 16, wherein using the soft label outputs includes:
using the soft label output of a less accurate teacher neural network among the plurality of teacher neural networks in an earlier iteration than the soft label output of an accurate teacher neural network among the plurality of teacher neural networks.

18. The computer program product of claim 15, wherein training the student neural network includes:
using the soft label output of the most accurate teacher neural network among the plurality of teacher neural networks in the last iteration.

19. The computer program product of claim 15, wherein the input data is audio data and each soft label output is a classification of the audio data.

20. The computer program product of claim 19, wherein the classification of the audio data identifies phonemes.

* * * * *